United States Patent [19]
Carr

[11] Patent Number: 5,638,758
[45] Date of Patent: Jun. 17, 1997

[54] PEDESTAL SUPPLY UNIT

[75] Inventor: Roger John Carr, Croydon, Great Britain

[73] Assignee: President Office Furniture Limited, United Kingdom

[21] Appl. No.: 544,183

[22] Filed: Oct. 17, 1995

[30] Foreign Application Priority Data

Oct. 18, 1994 [GB] United Kingdom ............. 94 20974.9
May 31, 1995 [GB] United Kingdom ............. 95 10941.9

[51] Int. Cl.⁶ .................................................. A47B 35/00
[52] U.S. Cl. ........................... 108/50; 108/150; 108/23; 108/64
[58] Field of Search ........................ 108/150, 50, 23, 108/64, 147; 312/223.6, 223.1

[56] References Cited

U.S. PATENT DOCUMENTS

| | | | |
|---|---|---|---|
| 1,425,582 | 8/1922 | Feigler | 108/150 |
| 2,090,248 | 8/1937 | Chakow | 108/23 |
| 2,652,657 | 9/1953 | Joy | 108/23 |
| 3,002,787 | 10/1961 | Ziegenfuss | 108/64 X |
| 3,538,862 | 11/1970 | Patriarca | 108/23 X |
| 3,867,622 | 2/1975 | Billman | 108/23 X |
| 4,615,279 | 10/1986 | De La Haye | 108/64 X |
| 4,756,496 | 7/1988 | Hosan et al. | 108/150 X |
| 4,875,418 | 10/1989 | Moeckl et al. | 108/50 |
| 4,879,955 | 11/1989 | Moll et al. | |
| 5,078,055 | 1/1992 | Bellini et al. | 108/64 |
| 5,272,988 | 12/1993 | Kelley et al. | 108/50 |

FOREIGN PATENT DOCUMENTS

| | | |
|---|---|---|
| 0 453 392 A2 | 10/1991 | European Pat. Off. . |
| 0 514 862 A1 | 11/1992 | European Pat. Off. . |
| 1530403 | 5/1968 | France ............. 108/23 |

Primary Examiner—Jose V. Chen
Attorney, Agent, or Firm—Kirschstein, et al.

[57] ABSTRACT

A pedestal supply unit for use with furniture, includes a vertically extendable pedestal support, an upper housing carried by the pedestal support and including supply outlets, an encircling shield round the supply outlets and a cover above the shield and so located as to define an opening between the shield and the cover to enable cabling to pass from the unit to adjacent equipment. The cover may be a top which matches the work tops of associated furniture units, and a flexible cable carrier with ball end connectors may be used for transferring cabling between units.

15 Claims, 4 Drawing Sheets

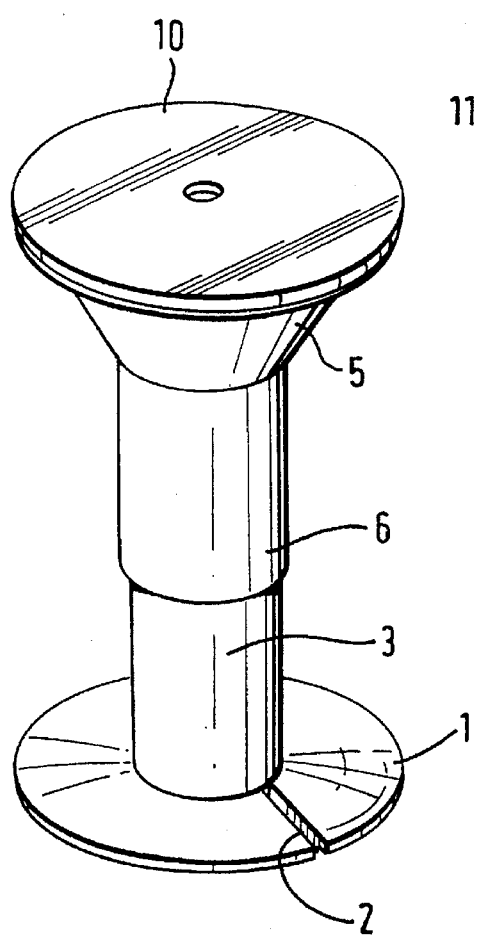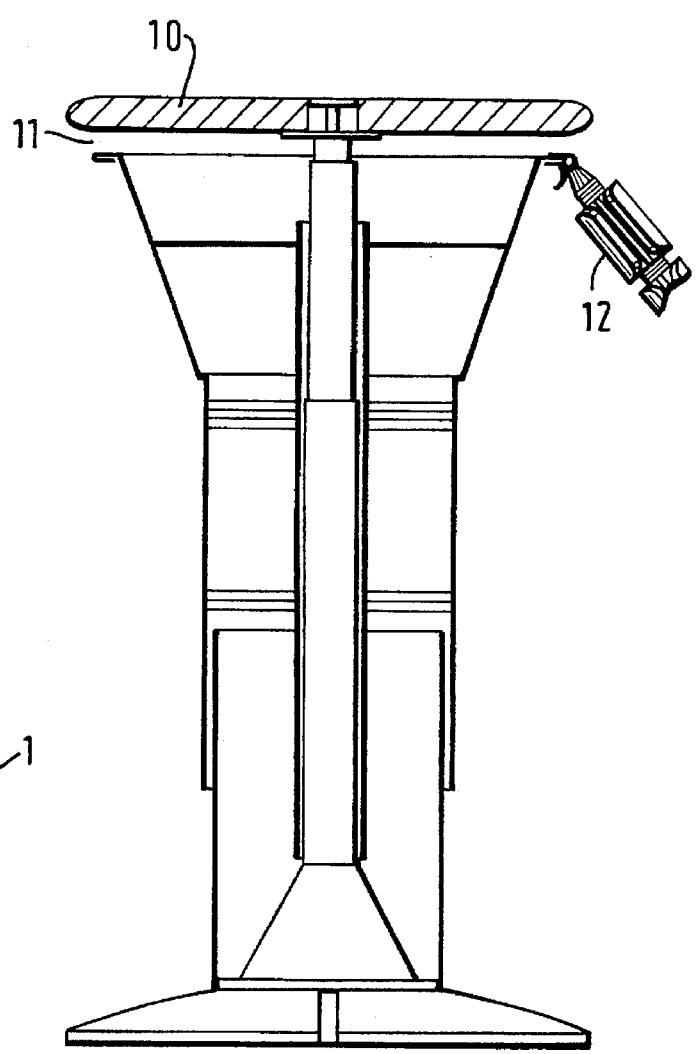

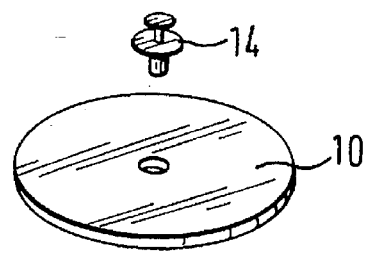
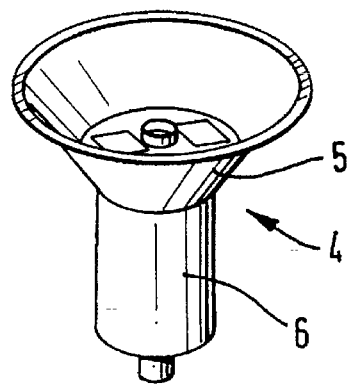
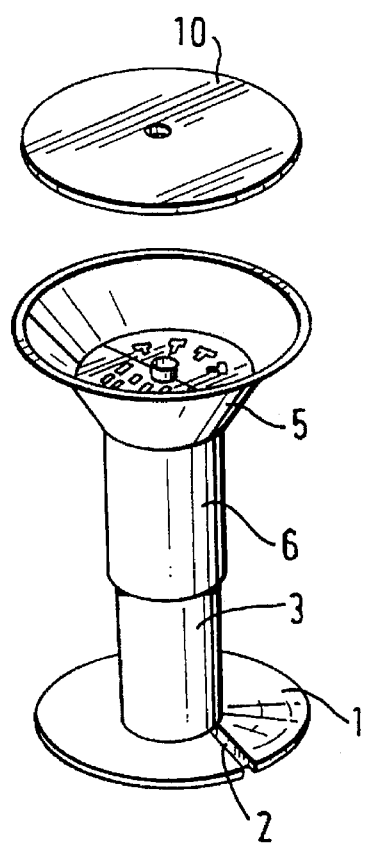
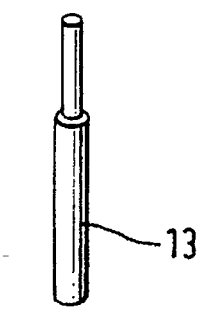
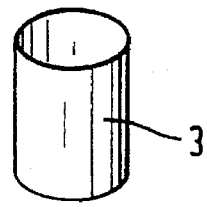
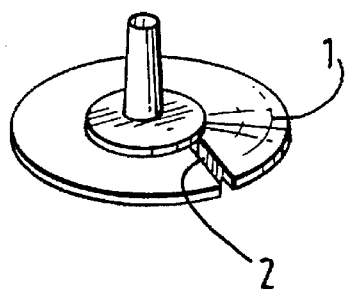

PEDESTAL SUPPLY UNIT

BACKGROUND OF THE INVENTION

The present invention relates to furniture used particularly in office environments where electrical cabling has to pass from one unit to another. An example is where a desk work station has a computer console and cabling such as mains power and network wiring has to pass from the computer to other positions.

A problem with computer cabling is that it needs to remain neat and yet to be accessible, and also that it should not provide risk to users tripping ever stray wires or to fire hazard if cables are inadequately shielded from damage.

SUMMARY OF THE INVENTION

Accordingly, the present invention provides a pedestal supply unit for use with furniture, comprising a vertically extendable pedestal support, an upper housing carried by said pedestal support and including supply outlets, an encircling shield round said supply outlets and a cover above said shield and so located as to define an opening between said shield and said cover to enable cabling to pass from the unit to adjacent equipment.

Preferably the shield is frustoconical and preferably the opening is a slot above said frustoconical shield.

The pedestal can be extendible by means of a central telescopic table incorporating a pneumatic or hydraulic cylinder which locks at intermediate positions by hand pressure.

BRIEF DESCRIPTION OF THE DRAWINGS

An embodiment of the invention will now be described by way of example with reference to the accompanying diagrammatic drawings in which:

FIG. 1 is a perspective view of a pedestal supply unit in accordance with the invention;

FIG. 2 shows a perspective view of the unit with its lid removed;

FIG. 3 shows an exploded view of the components of the pedestal supply unit;

FIG. 4 is a sectioned side elevation of the unit.

DETAILED DESCRIPTION OF THE PREFERRED EMBODIMENTS

Figure 5:
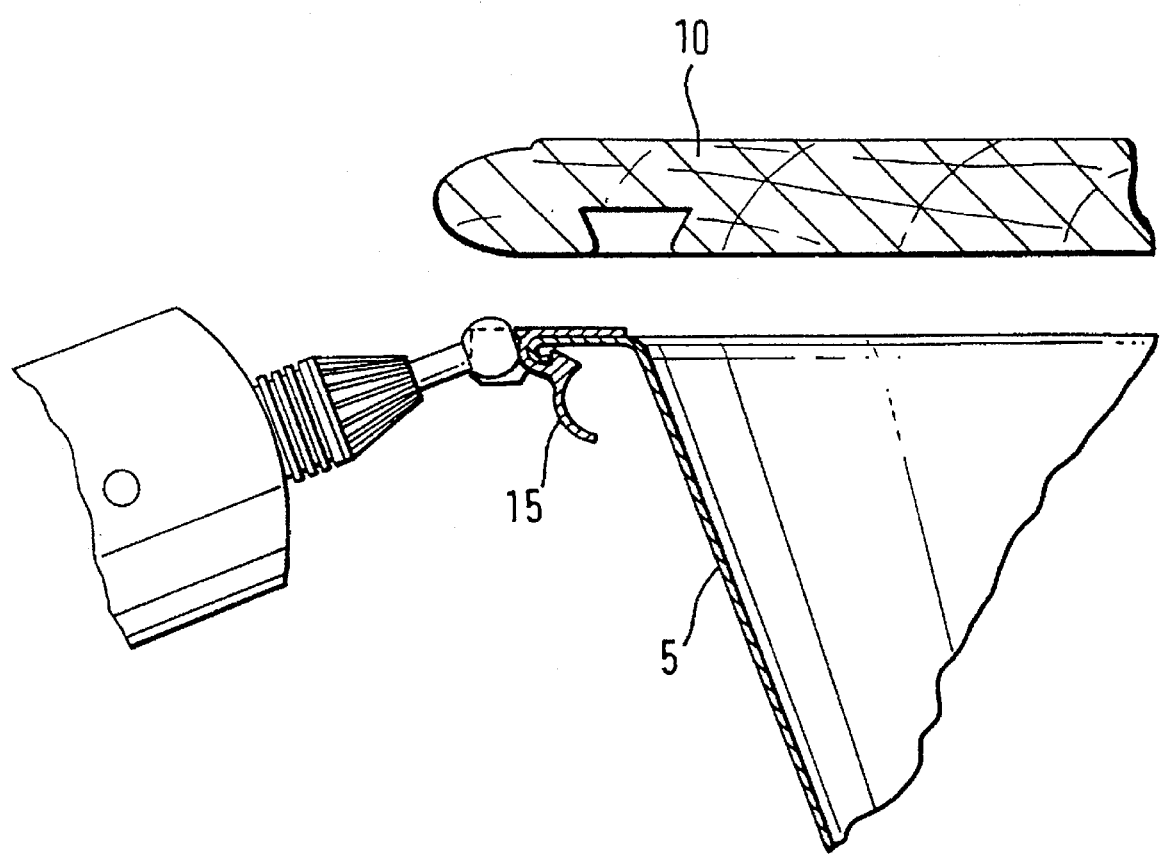
FIG. 5 is an enlarged detail of part of the FIG. 4 view.

Referring to FIG. 1, the pedestal supply unit comprises a base 1 having a slot 2 for cabling, a cylindrical lower casing 3 which snaps onto the base unit 1 and an upper unit 4 comprising a frustoconical shield 5 extending upwards from a second cylindrical casing 6 which slidingly fits over the casing 3.

At a lower end of the frustoconical shield 5 is a circular disc outlet plate 7 incorporating sockets 8 and outlets for wiring 9. This plate can be interchangeable for different power supply requirements.

A circular disc-shaped cover 10 then covers the frustoconical shield 5 while leaving a slot 11 for wiring to emerge. Slot 11 extends the whole way round the upper end of the frustoconical shield 5. The disc-shaped cover 10 is conveniently of a quality wood which matches that of other furniture, and particularly table tops, with which the unit can be associated.

Conveniently, one or more flexible cable carriers 12 can be connected to a rim at the upper edge of the frustoconical shield 5. The detail of this connection is shown in FIG. 5 where it can be seen that a ball at the end of the cable carrier is snapped into a fitment 15 at the edge of the shield 5. This fitment 15 is a snap fit to the rim of the shield 5.

The whole unit is kept together by a gas filled piston and cylinder telescopic tube 13 running vertically through the centre of the unit. At the centre of the cover 10 is a top plug 14. This holds the lid in position and can also be arranged as an actuator knob for controlling actuation of the compressed cylinder telescopic tube 13.

In use, the cover 10 can be removed for access to sockets 8 and then can be replaced and held in position by the top plug 14. The top plug 14 serves as an actuator knob enabling the pedestal unit to be adjusted in height. The piston and cylinder tube 13 can be actuated from the plug 14 to change its height and enable the system to be raised or lowered by hand pressure.

Thus, wiring can be maintained under control, being protected from accidental damage and pedestal units can be used where appropriate between desks and other pieces of furniture for supplying cabling in a controlled manner. For example various work tables can be located round the pedestal supply unit, all carrying computers, printers, telephones, modems and or similar equipment and all having their wiring supplied from the pedestal supply unit. Also, any excess cable can conveniently be kept within the pedestal supply unit.

Figure 6:
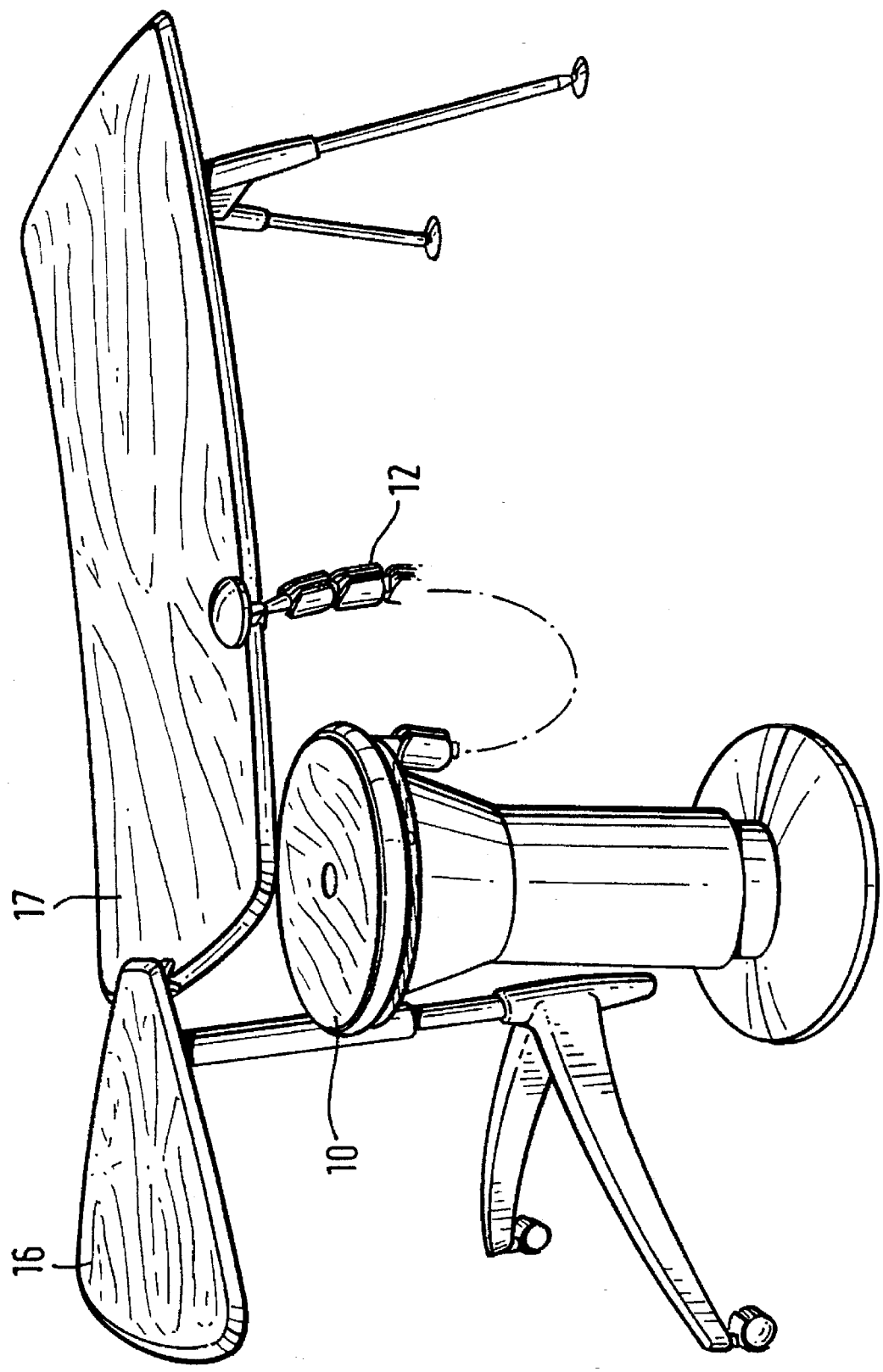
FIG. 6 shows a number of associated units of furniture.

FIG. 6 shows an arrangement involving the described pedestal supply unit acting in conjunction with other furniture units all of which have matching tops, that is the tops are of the same style of wood and their edges are treated in the same way. Referring to FIG. 6 the edge profile of the top 10 can be seen to have a distinctive rounded end with a rebated slot underneath. This rebated slot enables other equipment such as cable carriers and wiring distributor fitments to be snapped into the edge. This edge profile occurs at each of the top units 10, 16 and 17 and enables a pleasing working combination to be achieved where cabling can be readily supplied. Also, the vertical adjustment of the top 10 enables it to be at an optimum height in relation to the other furniture units.

I claim:

1. A furniture unit for supplying electrical cabling to electrical equipment, comprising:
    a pedestal base;
    a housing mounted on the base for movement relative to an upright axis, said housing having a frusto-conical shield, and a cover mounted above and spaced from the shield to bound a peripheral opening surrounding said axis; and
    a plurality of electrical supply outlets within the housing and connected to the cabling which passes through said opening to the electrical equipment.

2. The unit according to claim 1, wherein the base includes a radial slot.

3. The unit according to claim 1, wherein the base includes a lower cylindrical casing, and wherein the housing includes an upper cylindrical casing mounted for telescoping movement on the lower casing.

4. The unit according to claim 3, wherein the shield is mounted on the upper casing and diverges upwardly in a direction away from the base.

5. The unit according to claim 1, wherein the outlets are mounted on a plate interchangeably mounted within the shield.

6. The unit according to claim 1; and further comprising means for raising and lowering the housing relative to the base.

7. The unit according to claim 6, wherein said means includes a pressure-operated cylinder and piston assembly.

8. The unit according to claim 7, wherein the assembly includes a manual actuator centrally mounted on the cover.

9. The unit according to claim 1, wherein the cover includes an upper surface having a predetermined pattern to match outer surfaces of adjacent furniture.

10. The unit according to claim 1, wherein the shield has a peripheral rim; and further comprising a cable carrier mounted on the rim.

11. The unit according to claim 10, wherein the cable carrier has a mount that engages the rim with a snap action.

12. The unit according to claim 11, wherein the mount includes a ball joint.

13. A set of furniture, comprising:
   at least one table unit having a table top for supporting electrical equipment;
   a furniture unit for supplying electrical cabling to the electrical equipment, said furniture unit including
      a pedestal base,
      a housing mounted on the base movement relative to an upright axis, said housing having a frusto-conical shield that has a rim, and a cover mounted above and spaced from the shield to bound a peripheral opening surrounding said axis, said cover having an upper surface that matches an outer surface of said table top,
      a plurality of electrical supply outlets within the housing and connected to the cabling which passes through said opening to the electrical equipment; and
      a cable carrier mounted on the rim of the shield.

14. The furniture set according to claim 13, wherein the cable carrier has a mount that engages the rim with a snap action.

15. The furniture set according to claim 14, wherein the mount includes a ball joint.

* * * * *